United States Patent [19]
Bennett

[11] 3,722,721
[45] Mar. 27, 1973

[54] MEANS FOR LOADING AND UNLOADING A CAMPER

[76] Inventor: Melvin L. Bennett, 2739 South Martinson, Wichita, Kans. 67217

[22] Filed: July 13, 1971

[21] Appl. No.: 162,183

[52] U.S. Cl. ............... 214/515, 214/84, 193/35 SS
[51] Int. Cl. ................................................ B60p 3/38
[58] Field of Search ............... 214/515, 516, 517, 84; 193/35 SS

[56] References Cited

UNITED STATES PATENTS

| | | | |
|---|---|---|---|
| 2,958,432 | 11/1960 | Milhem | 214/84 |
| 3,175,717 | 3/1965 | Smith | 214/515 |
| 2,656,942 | 10/1953 | Helms | 214/515 |
| 3,598,261 | 8/1971 | Anderson | 214/515 |
| 2,360,133 | 10/1944 | Houssiere | 214/84 X |
| 2,693,286 | 11/1954 | Cocks | 214/84 |
| 3,655,234 | 4/1972 | Kirschbaum | 214/515 X |

Primary Examiner—Albert J. Makay
Attorney—Duane C. Bowen

[57] ABSTRACT

Rollers mounted on the bottom of a camper are retracted to inoperative position during camper use and are extended to antifrictionally support the camper on the pickup bed during loading and unloading of the camper. Upper channels are provided on the underside of the camper; pivotal bellcranks are pivotally mounted in the upper channels with the rollers supported on one set of arms of the bellcranks and the other set of arms engaging a common rod shifted to extend the rollers; gear and crank means move the common rods; and lower channels on the bed guide the rollers.

6 Claims, 6 Drawing Figures

MELVIN L. BENNETT
INVENTOR

BY ATTORNEY

MEANS FOR LOADING AND UNLOADING A CAMPER

BRIEF SUMMARY OF THE INVENTION

My invention relates to loading and unloading campers and more particularly to a system facilitating such loading and unloading by rollers extended from the bottom of the camper for antifrictional support during loading and unloading and retracted out of supporting relationship during normal transportation and use of the camper.

A number of considerations are involved in camper loading and unloading. One primary consideration is economy as there are many desirable accessories to a basic camper, which is quite expensive by itself, so that cost must be minimized for a loading and unloading system to have maximum use. Another primary consideration is ease of usage, especially to permit one person to be able to load and unload by himself, but secondarily to reduce the amount of time and the degree of manual force required even if more than one person is involved. Some prior systems could be operated by one person but relatively expensive constructions were used. It will be seen, hence, that two factors are interrelated, i.e., it is a problem to provide a system that one person can operate, or minimizing time and effort while still maintaining a low cost.

It is an objective of my invention to design a camper loading system that solves the above problem, a system of low cost that permits one-man loading, or a system that minimizes time and effort with one or more persons available to help. Further objectives of my invention include providing a system easy and safe to operate and one having minimum maintenance and a long life.

My invention will be best understood, together with additional objectives and advantages thereof, from the following description, read with reference to the drawings, in which.

Figure 1:
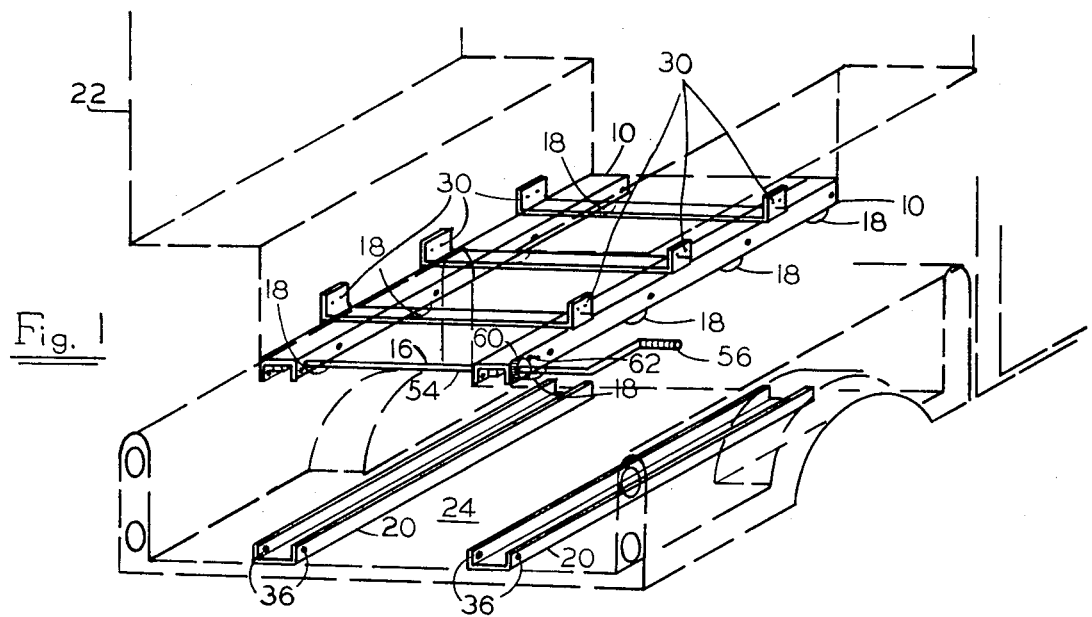
FIG. 1 is a perspective view of a specific embodiment of my new loading and unloading system, shown in conjunction with portions of a camper and portions of a pickup illustrated in dashed lines.

Principal parts in my camper loading system include upper channels 10, bellcranks 12 pivotally supported by channels 10, bellcrank-actuating rods 14, gear and crank means 16 for moving rods 14, rollers 18 rotatably mounted on bellcranks 12, and lower channels 20 guidably receiving rollers 18. The system supports camper 22 on rollers 18 during loading and unloading relative to pickup bed 24, and retracts rollers 18 to inoperative position for stability of camper 22 on bed 24 during transportation and use of camper 22.

Pickup campers come in various sizes and price ranges. I am using the expression "camper" to cover any type of camping housing mounted in the bed of a pickup truck to which my loading and unloading system can be adapted.

Channels 10 are illustrated as being secured to the bottom of camper 22 by straps 30 which are bent upwardly at their ends to abut the sidewalls of the lower section of the camper and are secured thereto by bolts or screws. The use of straps 30 is one way to provide ready installation of upper channels 10 on the bottom of an existing camper, although channels 10 can be secured by other means to existing campers or may be otherwise installed if incorporated into new campers in the process of original fabrication.

Lower channels 20 may be secured in the truck bed in any suitable manner. They serve the function of guiding rollers 18 in movement onto and off of bed 24.

Figure 2:
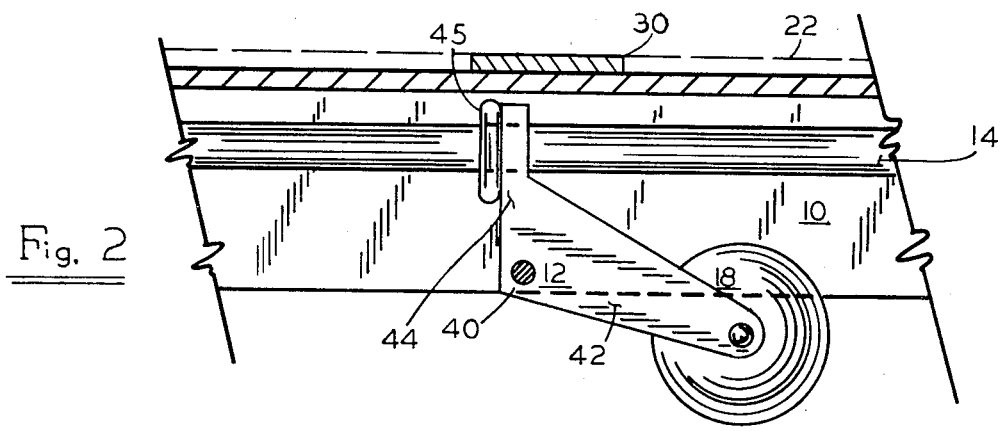
FIG. 2 is an enlarged, fragmentary side view of portions of the pivotal roller mounting assembly.
Figure 3:
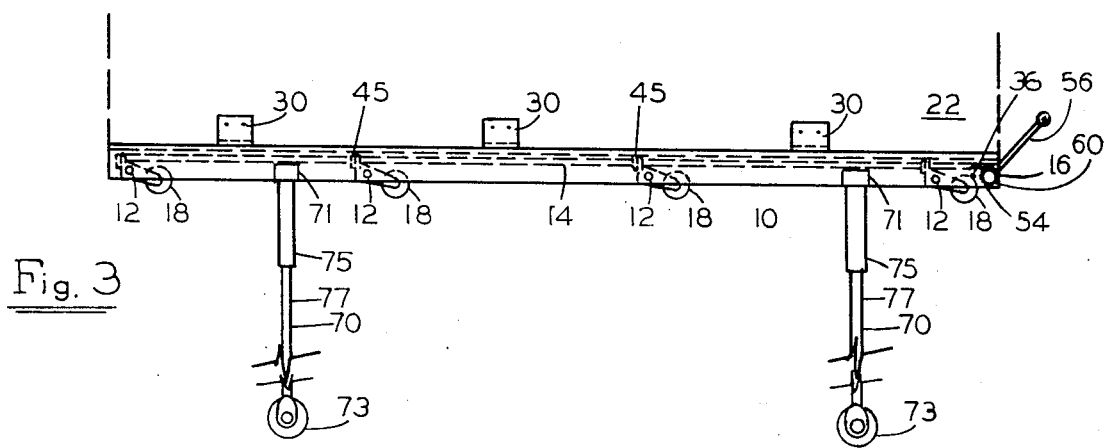
FIG. 3 is a side view of the upper channel together with portions of stands used to support the camper when it is unloaded from the pickup.
Figure 4:
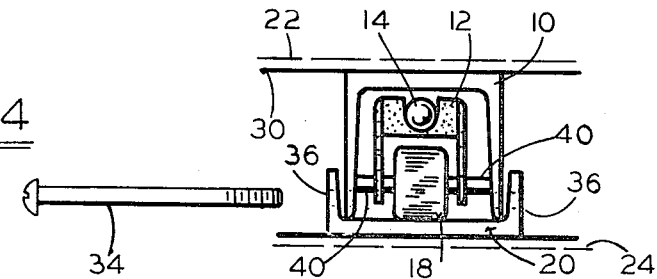
FIG. 4 is an enlarged end view of upper and lower channels in nested, abutted position, when the rollers are in retracted positions.
Figure 5:
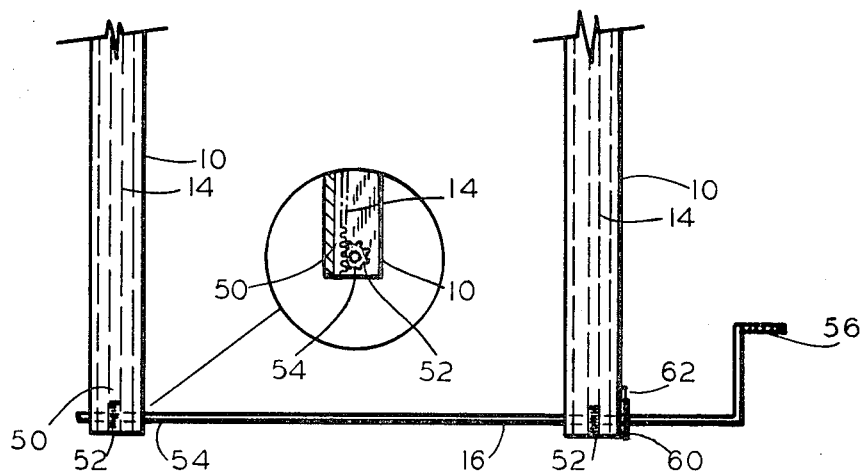
FIG. 5 is a combined view showing in plan vie the two upper channels and the crank operating assembly and showing exploded from the plan view and turned to the side details of the rack and pinion type connection between the crank shaft and the roller shifting rod.
Figure 6:
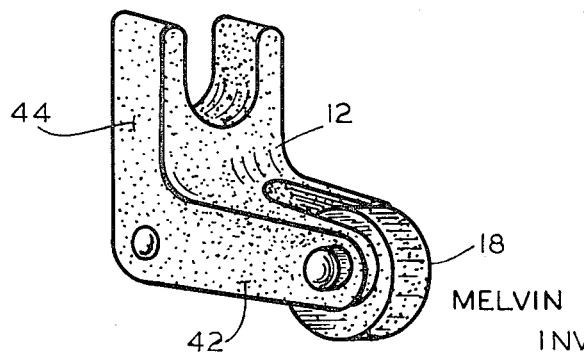
FIG. 6 is an enlarged perspective view of one of the bellcranks with a roller mounted on one arm thereof.

Rollers 18 in FIGS. 1–3 are shown extended to a lower position disposed to antifrictionally support camper 22 in movement onto and off of bed 24, and rollers 18 are shown in FIG. 4 in retracted upper position in which channels 10, 20 are nested and abut to frictionally hold camper 22 in position on bed 24. An additional securing means is shown in FIG. 4 in which pin means 34 (shown in removed position) is inserted through aligned openings (dotted lines 36 in FIG. 4) in channels 10, 20 and suitably secured, such as by nut or cotter key.

Bellcranks 12 are pivotally mounted in a suitable manner in upper channels 10 as on shafts 40. Each crank 12 has a roller 18 suitably rotatably mounted on one arm 42 and the other arm 44 is slotted to receive a rod 14. Rods 14 have abutments 45 thereon to act on arm 44 to pivot crank 12 to extend rollers 18. It will be understood that the rod-abutment system has only to apply force to cranks 12 in extension of rollers 18 (in effect to raise camper 22) as the cranks will retract due to the weight of camper 22 when permitted to do so by the rod-abutment structure.

Rods 14 are pulled so that abutments 45 act on cranks 12 to extend rollers 18 and raise camper 22. This can be accomplished by suitable means and is shown including rack means 50 on rods 14 and gears 52 engaging rack means 50. Gears 52 are secured to shaft 54 mounted in channels 10 by suitable bearing means. A crank 56 on shaft 54 is used to rotate gears 52 to pull rods 14 (which are slidably mounted within channels 10 by suitable guide means). Crank 56 can be removably mounted (i.e., with a socket-type connection to shaft 54) so it can be removed during pickup transportation. A ratchet 60 and pawl 62 are used to lock shaft 54 against reverse rotation when the rollers have been extended. It will be evident with a short camper fitting completely within the truck bed wherein access to the crank and ratchet location shown would be difficult, that a gearing connection at right angles can be used to bring the crank out the back, etc.

FIG. 3 indicates suitable, conventional stands 70 to support camper 22 on the ground when unloaded from the pickup. This feature is not illustrated in detail as such stands are in common use and usually fasten directly to the camper. As shown, stands 70 can fasten to channels 10 in my structure, by any suitable means, such as by being received in sockets 71 on the sides of channels 10, rather than fastening directly to the camper.

The operation of my apparatus will readily be understood from the foregoing but will be briefly reviewed below. Channels 10, 20 will be attached to camper 22 and bed 24, in original manufacture or later, in aligned positions so channels 10 will superpose to channels 20 in use. I will first describe loading and unloading with stationary supports and I will later describe operations with stands having casters on their lower ends. Presuming camper 22 is supported on stands 70 at proper level (which can be adjusted by appropriate jack means incorporated into stands 70 by use of separate jack means, or merely by selection of a suitable ground disposition in previous unloading), the pickup is backed under the camper forward of the forward stands 70. Crank 56 can be operated to pivot bellcranks 12 to extend rollers 18 to their lower operative positions. Note that if jacks 70 have a proper length relative to the height of bed 24 for a level grade, for example, rollers 18 in retracted positions and and channels 10 will have cleared the bottom of bed 24 and the extension of rollers 18 will have taken weight off the forward stands 70 by bearing on channels 20 (which would have been aligned in the vertical plane of channels 10 in backing the pickup into position) permitting removal of the forward stands 70.

The next step is to further back the pickup until it has reached a position in which three of the four pairs of rollers are on the pickup bed, at which time the weight will be off the rear stands, which can be removed. Completion of loading of the camper can be accomplished by pushing the camper forward into transportation position (manually or with suitable tools). If the bearings of wheels 18 are of good quality, considerable weight can be pushed by a single man. In the foregoing and following description of operation, note that the operations can be accomplished by a single person, although it will be convenient to have more than one person when available. The camper being fully loaded by the above procedures, pawl 62 is released and the crank 56 is operated to permit rollers 18 to retract, channels 10 become nested within channels 20, and one or more pins 34 can be used to fasten the channels together.

In unloading, pins 34 are removed and crank 56 is operated to extend rollers 18 to lower, extended supporting position. The grade should be selected with the length of stands 70 in mind (which is simplified if they have adjustable length). If the ground sloped downwardly too much rearwardly, precautions would have to be taken to avoid the camper moving too readily when supported on rollers 18. If the ground sloped downwardly too much forwardly, it could be difficult to move the camper on the bed without the aid of a tool such as a block and tackle.

The next step is to bring the camper back far enough (manually or with a tool) so that the rear pair of stands can be inserted. Then the camper can be brought back far enough so that the two rear sets of rollers 18 are past the channel guides 20, at which point the camper normally will tilt slightly and the rear end weight will rest on the rear stands 70. Next, the pickup is driven forwardly until the forward stand can be inserted. Depending on the grade, rollers 18 could be retracted enough to put weight on the forward stands 70. The pickup, next, can be driven out from supporting relationship to the camper. This would be done slowly to minimize shock if weight were not on forward stands 70 at the time rollers 18 cleared channels 18 and bed 24.

It will be understood from the foregoing steps of operation, that the forward stands 70 should be disposed between the first and second set of rollers from the front, and the rear stands 70 should be disposed between the third and fourth sets of rollers (in an installation having four sets of rollers).

The above procedures can be modified if the stands 70 are mounted on casters 73, which is preferred. In the following description, I will presume such caster mounting and adjustable length stands and a relatively flat site. To unload, rollers 18 are lowered (extended). The camper is rolled far enough to install rear stands 70. The length of stands 70 are adjusted (by parts 75, 77 of the stand having threaded connections for telescoping or jack-type action) to take some of the camper weight. The camper is then rolled back on the rear stand casters 73 (manually or by aid of a tool) until the forward stands can be installed. Then the pickup can be driven away. To load, the pickup is backed under the rear end of the camper. Rollers 18 are lowered into channels 20. The front stands 70 are reduced in length so that camper weight is on the truck bed and then the front stands are removed. The camper is then rolled forward (supported by forward rollers 18 and the casters 73 of the rear stands) until the camper is fully supported on the truck bed and the rear stands 70 can be removed. It will be observed, thus, that the system is easier to operate with stands 70 having casters 73 and with stands having adjustable lengths, especially if a site is selected fairly flat and without too much grade, as will usually be the case.

Having thus described my invention, I do not wish to be understood as limiting myself to the exact details of construction shown and described but instead wish to cover those modifications thereof, which will occur to those working in the art after learning of my invention, that are properly within the scope of my invention.

I claim:

1. In the combination of a camper on the bed of a pickup, means to facilitate loading and unloading of the camper onto and off of the pickup bed, comprising:
 a. roller means interposed between said bed and said camper including rollers spaced apart fore and aft and spaced apart laterally relative to said camper whereby the camper can have full antifrictional support on said bed,
 b. actuating means operative upon operator actuation to move said roller means between a first extended operative position antifrictionally supporting said camper and a second retracted inoperative position in which the camper frictionally rests on said bed thereby acting against relative movement between camper and bed during camper transportation and use, and
 c. a pair of upper channels attached to the bottom of said camper, the channels being parallel to and spaced apart on either side of the longitudinal axis of said camper, each channel having a pair of downwardly-directed flanges, said actuation means including a pivot member for each roller having an arm rotatably supporting the roller at the end thereof and the pivot member being pivotally connected to one of said channels to pivot about an axis lateral of the camper and spaced from the roller, the pivot member being pivotal between a first position in which the roller extends below the associated channel in said first extended position of said roller means and a second position in which the roller is retracted into the associated channel in said second retracted position of said roller means.

2. The subject matter of claim 1 in which each pivot member has the shape of a bellcrank with a second arm in crank relationship to the first arm, a rod in each channel supported to move longitudinally thereof, an abutment on the rods adjacent to each bellcrank and the second arms being engaged by the abutments, whereby the rollers are moved from retracted positions to extended positions by movement of said rods acting on said bellcranks.

3. The subject matter of claim 2 in which there is rack means on the rear portion of each rod, a gear engaged with each rack means, a shaft on which said gears are mounted extending laterally of said camper, and a crank on the end of said shaft, whereby said rods can be shifted to move said rollers from retracted positions to extended positions by operation of said crank, and ratchet and pawl means connected to said shaft to hold the rollers in extended positions.

4. The subject matter of claim 3 in which said channels are secured to the bottom of said camper by strap means extending laterally of said camper and secured to said channels and to said camper.

5. The subject matter of claim 1 in which there is a pair of lower channels secured to said truck bed each having a pair of upwardly-directed flanges, each channel being aligned below one of the channels on the bottom of the camper and each being positioned to guide the rollers associated with the channel above when the rollers are extended and are being moved in the process of loading or unloading the camper.

6. The subject matter of claim 5 in which the upper channel nests within the lower channel in the retracted position of the roller means, aligned holes in associated upper and lower channels, and pin means in said holes to secure the camper in place.

* * * * *